United States Patent [19]
Kaehler et al.

[11] Patent Number: 5,979,705
[45] Date of Patent: Nov. 9, 1999

[54] FUEL BLENDING USING BLEND COMPONENT OCTANE LEVELS

[75] Inventors: David L. Kaehler; John S. McSpadden, both of Greensboro; Steven N. Terranova, Durham, all of N.C.

[73] Assignee: Gilbarco Inc., Greensboro, N.C.

[21] Appl. No.: 09/087,425

[22] Filed: May 29, 1998

[51] Int. Cl.$^6$ ................................................ B67D 5/16
[52] U.S. Cl. .................... 222/71; 222/1; 222/26; 222/134; 222/14; 222/52; 141/94; 141/100; 141/104; 141/105; 73/23.2
[58] Field of Search ............. 222/1, 2, 26, 71, 222/134, 144.5, 52, 14; 141/4, 94, 95, 100, 103, 104, 105, 285; 73/23.2, 23.28, 152.18; 364/479.09, 479.11, 528.07; 137/3, 4, 92, 587

[56] References Cited

U.S. PATENT DOCUMENTS

| 3,751,644 | 8/1973 | Mayer ................................ 235/151.12 |
| 3,864,095 | 2/1975 | Sinclair et al. ................................ 44/2 |
| 3,999,959 | 12/1976 | Bajek ................................ 44/2 |
| 4,223,807 | 9/1980 | Caswell et al. ................................ 222/28 |
| 4,876,653 | 10/1989 | McSpadden et al. ................................ 364/479 |
| 4,963,745 | 10/1990 | Maggard ................................ 250/343 |
| 4,978,029 | 12/1990 | Furrow et al. ................................ 222/1 |
| 5,018,645 | 5/1991 | Zinsmeyer ................................ 222/14 |
| 5,029,100 | 7/1991 | Young et al. ................................ 364/479 |
| 5,038,971 | 8/1991 | Gayer et al. ................................ 222/1 |
| 5,125,533 | 6/1992 | Gayer et al. ................................ 222/28 |
| 5,203,384 | 4/1993 | Hansen ................................ 141/59 |
| 5,223,714 | 6/1993 | Maggard ................................ 250/343 |
| 5,225,679 | 7/1993 | Clarke et al. ................................ 250/343 |
| 5,257,720 | 11/1993 | Wulc et al. ................................ 222/20 |
| 5,412,581 | 5/1995 | Tackett ................................ 364/498 |
| 5,447,062 | 9/1995 | Kopl et al. ................................ 73/261 |
| 5,469,830 | 11/1995 | Gonzalez ................................ 123/515 |
| 5,569,922 | 10/1996 | Clarke ................................ 250/339.12 |
| 5,606,130 | 2/1997 | Sinha et al. ................................ 73/627 |
| 5,630,528 | 5/1997 | Nanaji ................................ 222/1 |
| 5,706,871 | 1/1998 | Andersson et al. ................................ 141/59 |

FOREIGN PATENT DOCUMENTS

| 0 723 929 A1 | 7/1996 | European Pat. Off. . |
| 0 572 621 B1 | 9/1996 | European Pat. Off. . |
| WO 98/15457 | 4/1998 | WIPO . |

OTHER PUBLICATIONS

TLS–305R Business Management and Environmental Compliance System; Copyright 1997.

*Primary Examiner*—Henry J. Recla
*Assistant Examiner*—Timothy L. Maust
*Attorney, Agent, or Firm*—Coats & Bennett, P.L.L.C

[57] ABSTRACT

A fuel dispensing installation that includes first and second fuel tanks containing first and second fuels of different octane levels. The tanks are provided with first and second octane level sensors mounted in the first and second fuel tanks respectively for measuring fuel octane levels and generating output signals indicative of the octane levels of the first and second fuels. Conduits from the first and second tanks transport the fuel to one or more fuel dispensers. The fuel dispensers include a blending system for blending the first and second fuels to form at least one blended fuel having an intermediate octane. A site controller in electronic communication with the blending system receives the output signals and controls the blending system to permit the dispensing of one or more blended fuels based on the measured octane levels of the first and second fuels.

17 Claims, 3 Drawing Sheets

FUEL BLENDING USING BLEND COMPONENT OCTANE LEVELS

FIELD OF THE INVENTION

The present invention relates generally to dispensing systems for delivering a desired blend of two products to a user. More particularly, the invention relates to monitoring the octane level of two fuel components in a blending process to ensure that a properly blended product is produced.

BACKGROUND OF THE INVENTION

Numerous systems have been disclosed for blending two or more fluids during the dispensing of a fluid product. Such systems are used quite often in a service station environment where it is desired to dispense a plurality of different grades or octane levels of gasoline products by blending a high octane level product with a low octane level product to create one or more mid-level octane products. Blending systems offer the potential for savings stemming from reduced storage capacity requirements both at the service station and the bulk plant level. One example of such a system is that disclosed in U.S. Pat. No. 4,876,653 ("the '653 patent") assigned to Gilbarco, Inc., the contents of which are incorporated herein by reference. The '653 patent discloses a system for blending low and high octane gasoline with the fuel flow rate in each of two fuel flow paths being under individual closed loop control. The system includes an algorithm for comparing the ratio of the actual accumulated volumes of the low octane to the high octane fuel relative to a statistically determined ratio of the ideal volume of the low to high octane fuel for the total accumulated volume of the sum of the volumes of the fuels at a given time. The system provides a very exact blend relative to a pre-selected blend ratio.

Each of the previous systems in this area, including that disclosed in the '653 patent, are based on an important underlying assumption: that the octane levels in the low and high octane fuel storage tanks are correct. Typically, it is assumed that the low octane blend component has an octane of about 86 to 87 and that the high octane component has an octane level of about 92 to 93. Given the octane variability inherent in he refining process, many oil companies add ½ to 1 point of octane to each of the lending components to ensure that each level of blended product meets or exceeds the posted octane rating. This extra octane is referred to as "octane give away" and can be quite costly. Thus, it would be desirable to eliminate the need to boost octane levels of the blending components to ensure that a proper blended product is provided to the customer.

Another potential problem with current octane blending systems is that they have no provision to detect the delivery of an incorrect octane level product in either the high or low level octane blending component storage tanks. That is, if a low octane product is dropped into both the low octane storage tank and to the high octane storage tank, it may not be possible to deliver a proper octane blend under any circumstances. Similarly, if a high octane product is delivered into the low octane product storage tank the station operator will lose an inordinate amount of money due to the "octane give away" occurring for both the blended and the low octane level products. Even if only a partial fuel delivery is dropped into the wrong tank, it may be impossible for a correctly blended product to be created. Thus, it would be desirable to provide a system for monitoring octane levels in blending component storage tanks to alert operators that blending component octane levels are outside desired limits and thus cannot be blended to meet posted octane levels.

Previous blending systems for service station use have not incorporated the actual octane levels of the blend components into the blend control process given the lack of acceptable octane sensors and the acceptance of the "octane give away" practice described above. In the past octane testing and sensing devices have required a great deal of time (in the context of a retail service station transaction) to perform using expensive laboratory equipment. Available octane sensors have required up to about four minutes to determine an octane level. The advent of real time octane sensors permits octane level to be included as a control parameter for octane blending in a service station setting. An example of such a sensor is that disclosed in Clarke et al., U.S. Pat. No. 5,225,679 the content of which is incorporated herein by reference. This sensor monitors hydrocarbon-based fuel properties using a mid-IR light source to illuminate fuel in a side stream flow provided for octane monitoring. The light passing through the fuel is received by a narrow bandwidth detector. The molecules of the fuel components are excited by the mid-IR light, and the amount of absorption exhibited by these excited molecules is detected and used to identify the presence of and to quantify the volume percent of the fuel components in solution. This information maybe used to determine known properties of the fuel solution to include octane levels.

There exists a need then for a dispenser-based and/or fueling system-base blending system that takes into account the actual and assumed octane levels of the blending components. Such a system would take advantage of modem octane sensors that provide much improved reaction times compared to prior art octane sensors.

SUMMARY OF THE INVENTION

The present invention provides a method and system for monitoring the octane levels of the components of a blended fuel as they are stored and as they are fed into a blending dispenser for three purposes. First, the system uses information concerning the octane levels of the product being supplied to the blending system to ensure that a properly blended product is produced. Second, the system ensures that the blending components available in the on-site fuel storage tanks are capable of creating the posted octane levels for blended fuel products. Third, the system ensures that only the necessary amount of expensive blending component is used to create a desired intermediate octane blend. The octane level information may be supplied in a number of different ways to the dispensing system components. The information may be fed from octane sensors located in underground fuel tanks to an electronic site controller or indirectly from the sensors to some other component of the fueling system and then to the site controller. Octane level information may also be supplied from tank-mounted sensors directly to blending dispensers for use by dispenser blending systems.

The present invention also relates to a fuel dispensing installation including first and second fuel tanks containing first and second fuels of different octane levels. First and second octane level sensors are mounted in the first and second fuel tanks respectively for generating an output signal indicative of the octane levels of the first and second fuels. Conduits extend from the first and second tanks to at least one fuel dispenser, the fuel dispenser including a blending system for blending the first and second fuels to form at least one mixture having an intermediate octane. The system also includes a site controller in electronic communication with the blending system for receiving the output signals, determining whether the mixture may be created based on the octane levels of the first and second fuels and controlling the blending system to permit the dispensing of the first and second fuels and the at least one mixture based on the octane levels of the first and second fuels. The site controller may deny delivery of one or more of the fuel grades if the desired octane levels cannot be achieved by some mixture of the first and second fuels.

In an alternative version of the embodiment just described the fuel dispenser blending system receives the octane sensor output signals, determines whether the at least one mixture may be created based on the octane levels of the first and second fuels and permits the dispensing of the first and second fuels and the at least one mixture based on the octane levels of the first and second fuels. As described above, the fuel dispenser in this embodiment may deny delivery of one or more of the fuel grades if the desired octane levels cannot be achieved by some mixture of the first and second fuels.

The present invention also relates to a method for controlling the blending of a low octane fuel source and a high octane fuel source to create at least one blended fuel grade and at least one non-blended fuel grade including determining the octane level of the low octane fuel source; determining the octane level of the high octane fuel source; comparing the octane levels so determined to predetermined minimum octane levels for each fuel source; determining which of the at least one blended and at least one non-blended fuel grades may be created using the results of the comparison. The method also includes permitting the dispensing of each blended fuel grade and non-blended fuel grade that the results of comparison indicates may be created.

Fuel dispensing is ceased if the comparison step indicates that none of the desired fuel grades may be created. The method may also include generating an alarm if the comparison step indicates that no desired blended fuel grade may be created. The alarm may be an audible alarm or a visual alarm created at either the dispenser for the customer or at a site operator station. Alternatively or in combination with the aforementioned alarm indications, the alarm condition may be transmitted to an offsite location remote from the blending apparatus.

The present invention also relates to a method for monitoring the blending by a fuel dispenser of a low octane fuel source and a high octane fuel source to create at least one blended fuel grade including determining an octane level of the at least one blended fuel; comparing the octane level so determined to a predetermined octane level or octane level range for the blended fuel; and permitting the dispensing of the blended fuel if actual octane level is at the predetermined octane level or within the octane level range.

It should be understood that both the foregoing general description and the following detailed description are exemplary and explanatory only and are not restrictive of the invention as claimed. The accompanying drawings, which are incorporated in and constitute a part of this specification, illustrate one embodiment of the invention and, together with the description, serve to explain the principles of the invention. It should also be understood that each of the embodiments described above has distinct advantages and that alternative combinations of the components of these embodiments may be used to create a variety of systems depending on the objectives and performance criteria desired.

DESCRIPTION OF THE PREFERRED EMBODIMENTS

Figures 1, 1A:
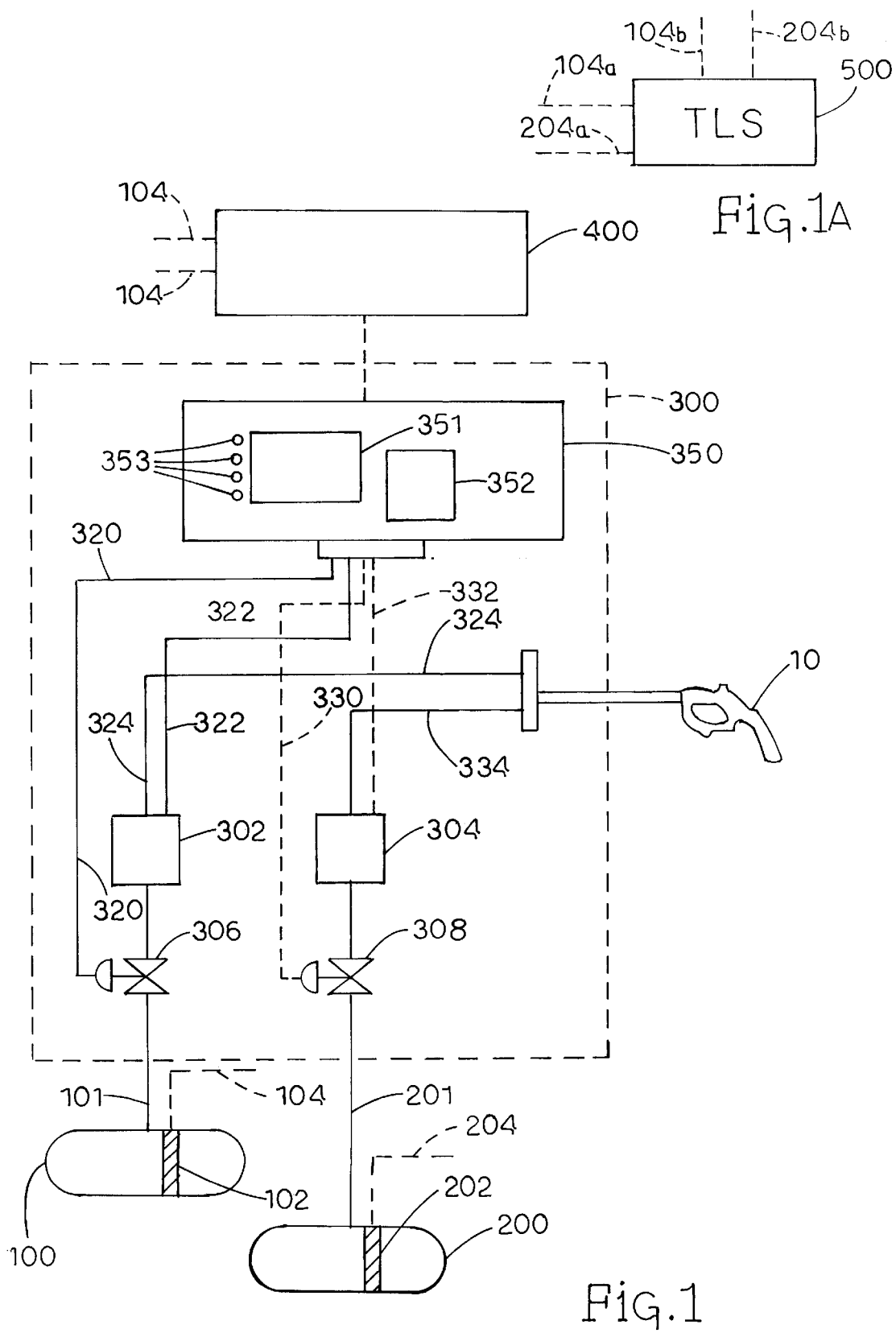
FIG. 1 is a block diagram of one embodiment of the present invention showing high octane and low octane blending components, a blending dispenser and a site controller.
FIG. 1A depicts an Electronic Tank Gauge that may be used with the present invention to receive signals carrying octane level information from fuel sources and to provide that information to either a dispenser controller or to a site controller to manage a fuel blending process.

A preferred embodiment of the present invention shown in FIG. 1 includes low octane product fuel tank 100, high octane product fuel tank 200, fuel dispenser 300, and site controller 400 in electronic communication with fuel dispenser electronics 350. Site controller 400 provides means for operating personnel to monitor and control the operation of fuel dispenser 300 and the octane level in fuel tanks 100,200. It should be understood that although only one fuel dispenser 300 is shown in FIG. 1, a typical installation would include several dispensers each in fluid communication with fuel tanks 100,200 and in electronic communication with site controller 400, as is well known in the art. Octane sensors 102,202 are provided in fuel tanks 100,200 for measuring the octane levels of the low octane and the high octane blend components and generating an output signal indicative of those octane levels. The output signals are sent via lines 104,204 to either dispenser electronics 350 or to site controller 400. Alternatively, octane level information may be sent to both components simultaneously.

Fuel dispenser 300 is in fluid communication with fuel tanks 100,200 via supply lines 101,201 and includes a customer display 351, an octane level display 352 and product blend selectors 353 for customer use to select the blended product desired for a particular transaction. Octane level display 352 provides a numeric readout of the octane level of the product being delivered to the customer. The other components of fuel dispenser 300 include first and second flow control valves 306,308 for controlling the flow rate of first and second products, respectively; and first and second flow meters 302,304 connected to flow control valves 306,308 for providing electronic signals 322,332 to dispenser electronics 350 indicative of the flow rate of a first and second products, respectively. Product flow lines 324, 334 provide a path for delivery of the first and second products to nozzle 10. As is well known in the art, nozzle 10 is connected to dispenser 300 via a flexible hose. First and second flow control valves 306,308 are controlled by dispenser electronics 350 via signal lines 320,330 respectively. Various other components such as fuel filters, check valves, solenoids and the like may also be provided as necessary.

In a preferred embodiment, the octane sensors mentioned above desirably are capable of determining the octane levels of the blend components and transmitting signals indicative of those octane levels to either a site controller 400, to dispenser controller/electronics 350, or to some other device as described in more detail below. The sensor must be capable of performing this function fast enough to enable site controller 400 working with dispenser electronics 350 or dispenser electronics 350 functioning alone to correct a blending process continuously within the time span of a typical retail transaction. The sensor reaction time must also take into account the amount of time necessary for fuel to travel from tanks 100,200 to dispenser 300. The scope of the present invention includes the use of currently known octane sensors and those may be developed in the future so long as they meet this performance requirement. Although "real time" octane sensors could be used for this purpose, less expensive octane sensors having slower reaction times are preferable for this preferred embodiment to achieve cost savings.

Figure 2:
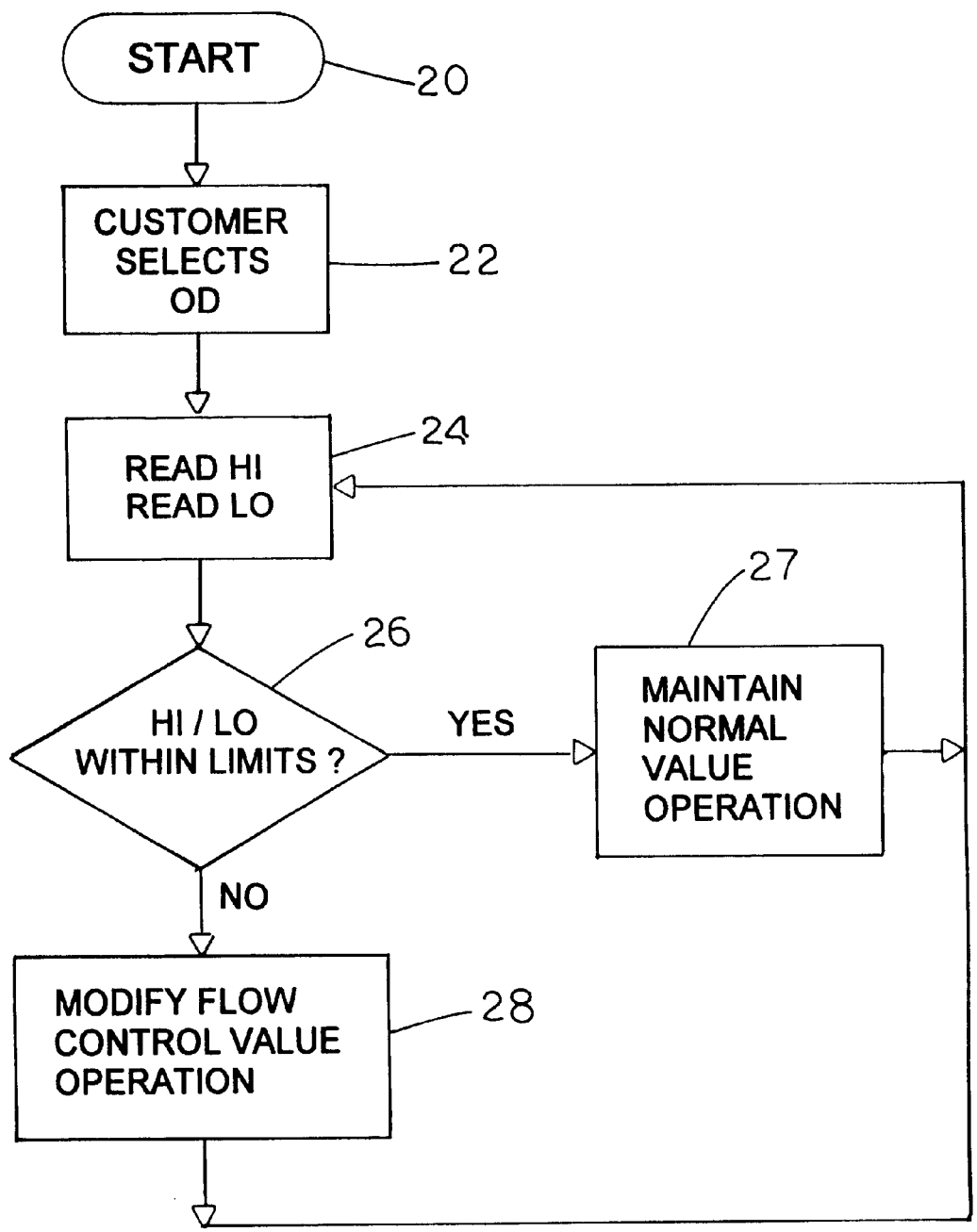
FIG. 2 is a flow chart illustrating the process steps using octane sensors in a low octane fuel and a high octane fuel for controlling the operation of a dispenser blending system.

The flow chart shown in FIG. 2 illustrates a preferred embodiment of the present invention using octane sensors in a fuel blending operation to incorporate the actual octane levels of the blending components into the blending process. The symbols used in the flow charts that follow are defined as follows:

"OD" refers to the octane level of the product requested by the customer. This product may be a low octane product or high octane product which normally require no blending or may be one or more mid-octane products which require blending.

"LO" and "HI" refer to the low octane blending component and the high octane blending component respectively.

Referring now to FIG. 2, the blend control process is entered at 20 and proceeds to 22 where the customer selects the fuel and the octane level to be delivered. In this example, the mid-octane product has been selected. Next, as fuel delivery begins, the blending controller in dispenser electronics 350 (or site controller 400) reads the octane level of the high and low octane blend components 100,200 using the output signal from blend octane sensors 102,202. At test 26 the octane levels of the blending components are compared to predetermined limits for the components. It should be understood that at test 26 the blend component octane values need not be identical to a single set point to satisfy the test. There may be room for a small amount of variation while still satisfying the test due to instrument error and as may be allowed by regulatory authorities. For instance a nominal 87 octane product may be acceptable if the actual measured octane value varies by ½ to 1 point on either side of that value. The exact of amount of acceptable variance can be determined readily by a person of ordinary skill. It should be understood that this comparison step includes comparison of the measured octane level to not only a fixed target value, but also to a target range of values.

If test 26 answers "yes," then the routine proceeds to 27 where flow control valves 306,308 are left in their current positions. This means that no control signals are generated beyond those normally generated by the system disclosed in the '653 patent. The routine returns to 24 and the octane levels of the blend components are read again.

If test 26 answers no, then the routine proceeds to 28 where blend controller in dispenser electronics 350 controls flow control valves 306,308 to reduce/increase the amount of high octane or low octane blend component as necessary. This step amounts to changing the mixing ratios used for the blending components used to create the blended fuel. Either action may be used singly or in combination to correct the octane level of the blended product. This control step is accomplished based on the actual octane levels of the blend components and not based on an assumed octane level.

Figure 3:
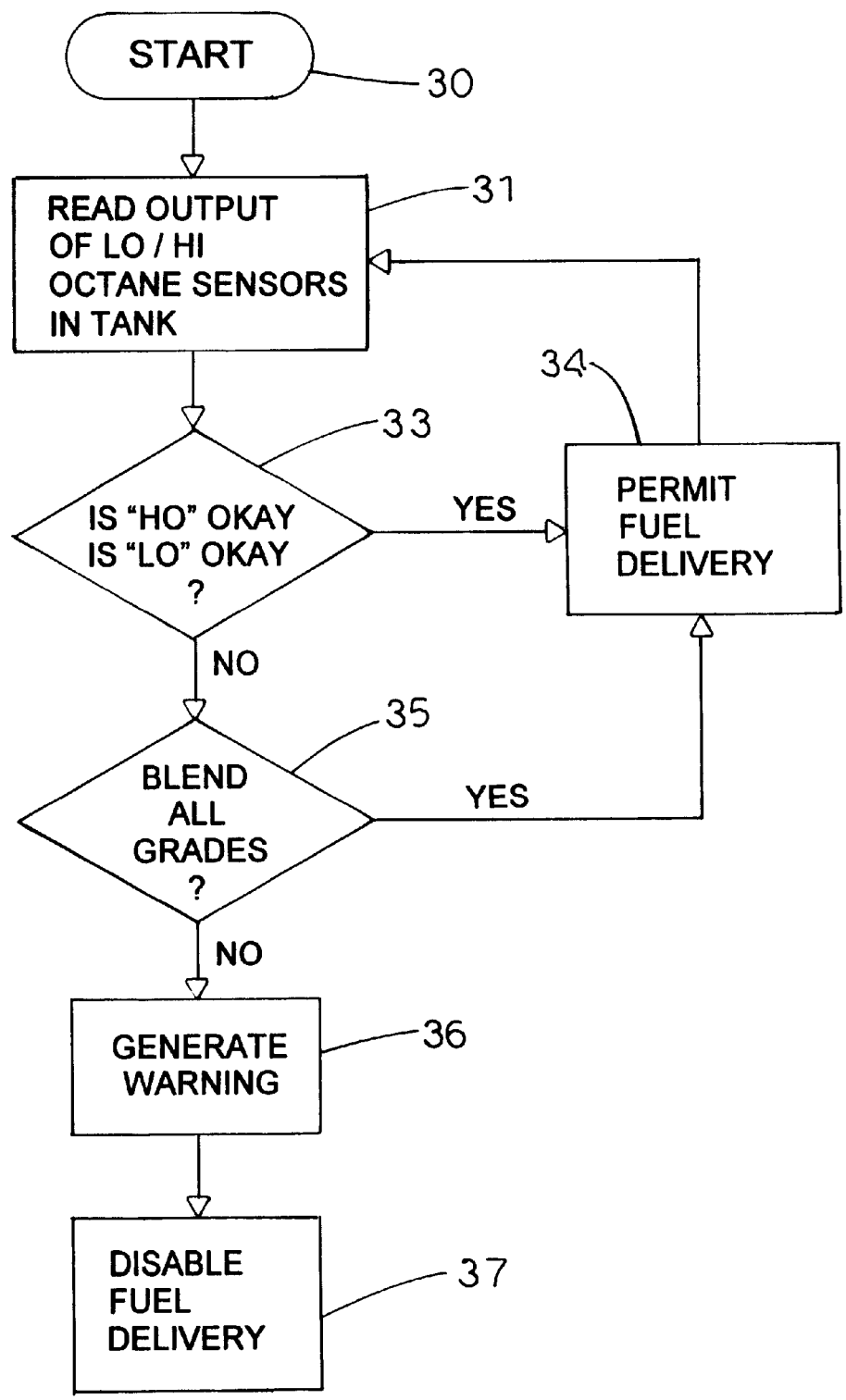
FIG. 3 is a flow chart illustrating an alternative embodiment of the present invention that determines whether a requested blended fuel can be produced or produced economically given the octane levels of the available blending components.

Another aspect of the blending system of the present invention involves checking blend component octane levels before a fuel delivery commences, as illustrated in the flow chart in FIG. 3. For the purposes of this explanation it will be assumed that the system will use a low octane blending component and a high octane blending component to provide a low octane product, at least one mid-octane (intermediate) product and a high octane product. The mid-octane product is the result of some blend of the low and high octane blending components. Periodically, site controller 400 polls fuel sources 100,200 as indicated at 31 to determine the octane rating of the fuels stored therein. This polling may take place continuously or may be conducted only after a fuel delivery takes place. Next, at test 33 the actual octane level of the blending components is compared to predetermined minimums necessary for making the product requested by the customer.

If test 33 answers yes, i.e. octane levels reported by sensors 102,202 are at least the minimums required to create the blended product, then site controller will permit fueling operations to take place 34. However, if the test 33 answers no, then test 35 asks whether all desired product grades can be blended with the blending components available. Alternatively, this test asks whether the product requested for a particular transaction is available. If test 35 answers yes, then fueling is permitted, block 34. If test 35 answers no, then a warning to operators is generated 36 and, optionally, fueling operations are disabled at step 37 for all products. Optionally, fueling operations may be disabled only for those products that cannot be created using the octane levels available.

The "no" answer to test 35 will be referred to as an error condition. By way of non-limiting example, there are three possible error conditions that could cause site controller to disable fueling operations partially or completely. The first error condition occurs when the low octane blending component is at a proper minimum level but the high octane blending component is not at its minimum level. This error could be caused by dropping an incorrect grade of fuel in the underground tank for the high octane blending component. In this instance, a high octane product cannot be provided. However, a low octane product and possibly a mid-octane product may be delivered. The mid-octane product may be delivered if the product in the high octane blending component tank is still high enough to create the mid-octane product. Site controller 400 would indicate to operating personnel and also to customers via dispenser displays 351,352 that the high octane product is unavailable, that the low octane product is available and, possibly, that the mid-octane product is available.

In the second error condition the low octane blending component does not contain the minimum required octane level. Assuming that the high octane blending component is at its minimum level, then potentially all three products could be provided, however, some amount of high octane blending component must be blended with the unacceptable low octane blending component to create the low octane product. Also, the mid-octane product could be blended but will require more than the usual amount of the high octane blending component to reach the proper octane level. Although it is possible in this error condition to provide each of the final products, doing so is disadvantageous economically because an excessive amount of the costly high octane blending component will be required to blend the final products. In this instance, site controller 400 could shut down all fueling operations and provide an audible/visible error signal to operating personnel. Alternatively, site controller 400 could allow fueling operations to continue while providing the audible/visual warning signal to operators so that they may take corrective action.

The third error condition occurs when both the low octane and high octane blending components are below minimum octane levels. Here, it will be impossible to provide the high octane product. It may or may not be possible to provide the low octane product and/or the mid-octane product Site controller 400 may disable all fueling operations, providing notification to operating personnel and customers of the error condition, or may permit the blending and dispensing of those products which can be blended properly while providing notification of the error condition to operators. In the last instance, site controller 400 would show a message on customer display 352 that certain grades of product are unavailable.

Examples of these error conditions are further illustrated in Table 1 below. The table is based on a high octane blending component having 93 octane and a low octane blending component having 87 octane. The two components are blended to create an intermediate octane blended product having an octane level between 87 and 93. The blending dispenser will thus provide a high grade product (93 octane), a mid-grade product (between 87–93 octane) and a low grade product (87 octane). Table 1 shows which of these products can be provided based on the octane levels of the available blending components, and whether such blending possibly will be at an economic loss from the ideal.

TABLE 1

|  | High Octane Level | Low Octane Level | Possible Octane Levels (Economic Loss) |
|---|---|---|---|
| Ideal | 93 | 87 | 87–93 |
| Error Cond. 1 | 87 | 87 | 87 only |
| Error Cond. 2 | 93 | 80 | 87–93 (But at a loss) |
| Error Cond. 3 | 90 | 87 | 87–90 only (But at a loss) |
| Error Cond. 4 | 86 | 86 | No product |
| Error Cond. 5 | 87 | 93 | 87–93 (But at a loss) |

It will be understood readily that blending components having other octane levels may be used and that one or more blended intermediate octane products having different octane levels may be produced. In each of these situations, the kinds of errors illustrated above could be encountered.

Other error scenarios could occur. However, each will include the steps of determining the octane levels of the blending components, comparing those octane levels to predetermined minimums, determining which of the desired fuel grades may be created using the results of the comparison step and then either permitting the dispensing of some or none of the final products. The products made available will depend on the limits created by the available octane levels and the acceptable economic losses incurred to blend all products. Preferably the measured octane levels will be used as reference points in determining proportions as blending occurs. It will be readily understood that the flexibility of currently available site controllers provide a number of performance options. A suitable controller for carrying out the practice of the present invention includes the G SITE™ series of site controllers available from Gilbarco, Inc.

Site controller 400 may be in direct communication with octane sensors 102,202 to carry out the functions described above. Alternatively, site controller 400 may obtain octane level information indirectly from other installed components. Widely available underground tank electronic tank gauges or level sensors ("ETG") 500 (FIG. 1A) such as the TLS-350 series available from the Veeder-Root subsidiary of the Danaher Corporation may be provided with octane sensing capability and interfaced with site controller 400. The TLS-350 model uses a capacitance-type probe to determine liquid levels in the underground tank. When used with the present invention, the probes may also be outfitted with at least one real time octane sensor. The ETG would be programmed to poll third and fourth octane sensors 102,202 (FIG. 1) periodically via signal lines 104a,204a and provide octane level information to site controller 400 via signal lines 104b,204b. Alternatively, the ETG 500 may monitor tank liquid level for an increase indicative of a fuel delivery and detect octane levels at that time. Also, octane levels may be monitored from offsite locations either directly via a link with the ETG or from site controller 500 using information supplied from the ETG. It will be readily understood that any alarm condition generated by the ETG, dispenser controller or site controller may be transmitted to an offsite location via a phone dial up connection or satellite link. The Veeder-Root system described above provides a well-known capability for offsite monitoring of alarm conditions.

Other ETG systems may be used in the practice of the present invention. For example, the Gilbarco TANK MONITOR™ 2 or 2.1 may be used.

Each of the octane sensors described above may provide either an analog or a digital output. If an analog output is used, then it is desirable to make an analog/digital conversion depending on the makeup of dispenser electronics 350 and site controller 400. The conversion may be made in either one of those components. Alternatively, the conversion may take place in the ETG 500 prior to relaying the signals to site controller 400 or dispenser electronics 350 or could take place in the sensor itself.

Historical information concerning the octane levels of the blending components may be stored in dispenser electronics 350, site controller 400 or other storage device for compliance monitoring by weights and measures authorities. These authorities may monitor octane levels from a remote location using the techniques described herein. The advantages of such remote monitoring include reduced costs of compliance inspections and the ability to conduct unannounced monitoring checks on octane levels being delivered to the public.

Although the present invention has been described with preferred embodiments, it is to be understood that modifications and variations may be utilized without departing from the spirit and scope of this invention, as those of skill in the art will readily understand. Such modifications and variations are considered to be within the purview and scope of the appended claims and their equivalents.

We claim:

1. A fuel dispensing installation comprising
    a) first and second fuel tanks containing first and second fuels of different octane levels,
    b) first and second octane level sensors mounted in the first and second fuel tanks respectively for measuring fuel octane levels and generating output signals indicative of the octane levels of the first and second fuels;
    c) conduits from the first and second tanks to at least one fuel dispenser, the at least one fuel dispenser including a blending system for blending the first and second fuels to form at least one blended fuel having an intermediate octane, and d) a site controller in electronic communication with the blending system for receiving the output signals and controlling the blending system to permit the dispensing of the at least one blended fuel based on the measured octane levels of the first and second fuels.

2. The fuel dispensing installation of claim 1 wherein the site controller determines whether the at least one blended fuel may be created based on the octane levels of the first and second fuels and permits fuel dispensing if the at least one fuel may be created.

3. The fuel dispensing installation of claim 1 wherein the site controller generates an alarm if the at least one mixture cannot be created based on the octane levels of the first and second fuels.

4. The fuel dispensing installation of claim 3 wherein the alarm is an audible alarm.

5. The fuel dispensing installation of claim 3 wherein the alarm is a visible alarm.

6. The fuel dispensing installation of claim 1 further comprising an electronic tank gauge system in electronic communication with the octane level sensors and with the site controller.

7. The fuel dispensing installation of claim 1 wherein the at least one fuel dispenser includes an octane display.

8. A fuel dispensing installation comprising
   a) first and second fuel tanks containing first and second fuels of different octane levels,
   b) first and second octane level sensors mounted in the first and second fuel tanks respectively for measuring fuel octane levels and generating output signals indicative of the octane levels of the first and second fuels;
   c) conduits from the first and second tanks to at least one fuel dispenser,
   d) a blending system located in the at least one fuel dispenser for receiving the output signals and blending the first and second fuels to form at least one mixture having an intermediate octane based on the output signals.

9. A fuel dispensing installation according to claim 8 wherein the blending system determines whether the at least one mixture may be created based on the octane levels of the first and second fuels and permits the dispensing of the first and second fuels and the at least one mixture based on the octane levels of the first and second fuels.

10. A fuel dispensing installation according to claim 8 wherein the at least one dispenser further includes an octane display.

11. A method for controlling the blending of a low octane fuel and a high octane fuel to create at least one blended fuel grade or at least one non-blended fuel grade comprising:
   a) determining inside a first tank the actual octane level of the low octane fuel source therein;
   b) determining inside a second tank the actual octane level of the high octane fuel source therein;
   c) comparing the actual octane levels determined in steps a) and b) to predetermined levels for each fuel source to determine if the difference between the actual levels and predetermined levels are within predetermined limits;
   d) determining the amount of each said high and low fuel source required to create at least one blended or at least one non-blended fuel grade based on the results of the comparison of step c); and
   e) permitting the dispensing of each blended fuel grade and non-blended fuel grade that the result of comparison of step c) indicates may be created.

12. The method of claim 11 further comprising ceasing fuel dispensing of a blended or non-blended fuel grade if the comparison of step c) indicates that such blended or non-blended fuel grade cannot be created.

13. The method of claim 11 further comprising generating an alarm if the comparison of step c) indicates that a blended or non-blended fuel grade cannot be created.

14. The method of claim 13 wherein the alarm is an audible alarm.

15. The method of claim 13 wherein the alarm is a visible alarm.

16. The method of claim 13 wherein the alarm is an offsite alarm.

17. A method for controlling the blending of a low octane fuel and a high octane fuel by a fuel dispenser blending system to create at least one blended fuel grade comprising:
   a) determining inside a first tank the actual octane level of the low octane fuel therein;
   b) determining inside a second tank the actual octane level of the high octane fuel therein;
   c) comparing the actual octane levels determined in steps a) and b) to predetermined levels for each fuel source to determine if the difference between the actual levels and predetermined levels are within set limits;
   d) providing the results of comparison of step c) to the fuel dispenser blending system; and
   e) modifying the operation of the blending system as needed depending on the results of step d).

* * * * *